United States Patent
Cheng et al.

(10) Patent No.: US 10,664,449 B2
(45) Date of Patent: May 26, 2020

(54) FILE DEDUPLICATION PROCESSING SYSTEM AND FILE PROCESSING METHOD THEREOF

(71) Applicant: QNAP SYSTEMS, INC., New Taipei (TW)

(72) Inventors: Chin-Tsung Cheng, New Taipei (TW); Jing-Wei Su, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 170 days.

(21) Appl. No.: 16/056,538

(22) Filed: Aug. 7, 2018

(65) Prior Publication Data
US 2019/0303455 A1    Oct. 3, 2019

(30) Foreign Application Priority Data

Mar. 29, 2018 (TW) .............................. 107111046 A (51) Int. Cl.
*G06F 16/00* (2019.01)
*G06F 16/174* (2019.01)

(52) U.S. Cl.
CPC ................................ *G06F 16/1752* (2019.01)

(58) Field of Classification Search
CPC ............. G06F 21/6218; G06F 16/1752; G06F 16/176; G06F 17/30; G06F 11/1076; G06F 12/0253; G06F 2221/2107; G06F 3/065
See application file for complete search history.

(56) References Cited

U.S. PATENT DOCUMENTS

| | | | |
|---|---|---|---|
| 8,650,162 B1 * | 2/2014 | Vaikar | G06F 11/1451 707/692 |
| 9,003,200 B1 * | 4/2015 | Gardner | G06F 16/137 713/189 |
| 10,120,875 B1 * | 11/2018 | Duggal | G06F 16/13 |
| 2012/0254257 A1 * | 10/2012 | Mitra | G06F 12/12 707/803 |
| 2013/0060739 A1 | 3/2013 | Kalach et al. | |
| 2014/0250079 A1 | 9/2014 | Gardner et al. | |
| 2016/0098568 A1 * | 4/2016 | Bushman | G06F 16/90335 713/189 |

FOREIGN PATENT DOCUMENTS

CN  102880663  1/2013

OTHER PUBLICATIONS

"Office Action of Taiwan Counterpart Application," dated Aug. 26, 2019, p. 1-p. 11.

* cited by examiner

Primary Examiner — Augustine K. Obisesan
(74) Attorney, Agent, or Firm — JCIPRNET (57) ABSTRACT

A file deduplication processing system is provided. The system deduplicates raw files to generate deduplicated vault files and a descriptor indicating a storage location of each data chunk in the vault files corresponding to the raw files. When receiving a writing request of a write data, the system finds at least one data chunk including old data corresponding to the write data according to the descriptor, loads and recovers the data chunk whose boundary is not overlapped with a boundary of the write data in the vault file comprising the old data corresponding to the write data so as to generate an update data by incorporating the recovered data chunk and the write data, deduplicates the update data to generate a new vault file and stores the same in the chunk store, and updates a content corresponding to each data chunk in the descriptor.

20 Claims, 6 Drawing Sheets

FILE DEDUPLICATION PROCESSING SYSTEM AND FILE PROCESSING METHOD THEREOF

CROSS-REFERENCE TO RELATED APPLICATION

This application claims the priority benefit of Taiwan application serial no. 107111046, filed on Mar. 29, 2018. The entirety of the above-mentioned patent application is hereby incorporated by reference herein and made a part of this specification.

BACKGROUND

Field of the Invention

This invention is related to a file processing technique and more particularly, to a file deduplication (dedup) processing system and a file processing method thereof.

Description of Related Art

In the era of information, data reduction has played an important role for the sake of dealing with data in a huge amount. One of the techniques for data reduction is data deduplication, by which duplicate data is deleted from a computer, and only one copy of the data is reserved.

However, a file system capable of data reduction has to recover raw files before the files are backuped in or transferred to other heterogeneous file systems and thus, is not applicable for backuping in other machines or clouds. Accordingly, for the system capable of data reduction, how to process the data as well as maintain deduplication characteristics is one of the problems to be solved by the persons skilled in the art.

SUMMARY

The disclosure provides a file deduplication (dedup) processing system and a file processing method thereof for executing file processing in a system capable of data reduction.

The disclosure provides a file dedup processing system. The file dedup processing system includes a storage device and a processor. The processor is coupled to the storage device. The processor loads and executes a file dedup subsystem and a file subsystem stored in the storage device. The file dedup subsystem deduplicates at least one raw file so as to generate at least one deduplicated vault file and at least one descriptor. The vault file includes at least one data chunk and is stored in at least one chunk store. The descriptor is configured to indicate a storage location of each of the at least one data chunk in the vault file corresponding to the raw file and a storage location of the vault file in the chunk store. The file subsystem writes and reads files. The file subsystem finds the vault file including old data corresponding to one write data according to the descriptor when receiving a writing request of the write data. The file dedup subsystem reads and recovers the data chunk whose boundary is not overlapped with a boundary of the write data in the vault file including the old data corresponding to the write data and does not read nor recover the data chunk whose boundary is overlapped with the boundary of the write data so as to generate one update data by incorporating the recovered data chunk and the write data, deduplicates the update data to generate a new vault file and stores the same in the chunk store, and updates a content corresponding to each of the at least one data chunk in the descriptor.

The disclosure provides a file processing method applicable for a file dedup processing system including a storage device and a processor. The file processing method includes the following steps. A writing request of one write data is received by the processor. At least one vault file comprising old data corresponding to the write data according to at least one descriptor stored in the storage device by the processor, wherein the vault file is obtained by deduplicating at least one raw file and is stored in at least one chunk store, and the descriptor indicates a storage location of each of at least one data chunk in the vault file corresponding to the raw file and a storage location of the vault file in the chunk store. By the processor, the data chunk whose boundary is not overlapped with a boundary of the write data in the vault file is read and recovered, and the data chunk whose boundary is overlapped with the boundary of the write data in the vault file is not read nor recovered, so as to generate one update data by incorporating the recovered data chunk and the write data. By the processor, the update data is deduplicated to generate a new vault file and is stored in the chunk store, and the descriptor indicating the storage location of the write data in the chunk store is updated.

To sum up, in the file dedup processing system and the file processing method thereof provided by the disclosure, files are periodically deduplicated as the vault files, the vault files recording the write data in the chunk store are found according to the descriptors obtained by previously executed deduplication when the writing request of the write data is received, wherein the data chunks belonging to the vault files and the data chunks belonging to the write data are only partially or all overlapped, the data chunks in the vault files which are partially overlapped with the write data are recovered and incorporated with the write data, the incorporated data is re-deduplicated to generate new vault files, and the descriptors are updated. In this way, optimization of the file processing can be achieved while the data reduction is executed.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
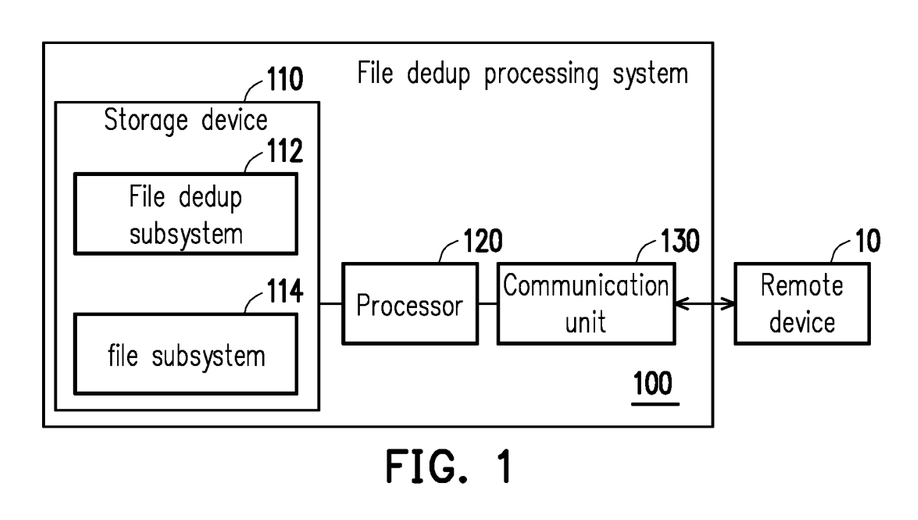
FIG. 1 is a diagram illustrating an architecture of a file deduplication (dedup) processing system according to an embodiment of the disclosure.

A file deduplication (dedup) processing system 100 of the disclosure provides capabilities of storing, reading and managing files. FIG. 1 is a diagram illustrating an architecture of a file deduplication (dedup) processing system according to an embodiment of the disclosure. Referring to FIG. 1, the file dedup processing system 100 of the disclosure includes a storage device 110, a processor 120 and a communication unit 130, and functions thereof are respectively described as below.

The storage device 110 stores program codes and data required for operating the file dedup processing system 100. Particularly, the storage device 110 may provide a storage space required by the file dedup processing system 100 when providing the capabilities of storing and reading files. The storage device 110 may be any type of fixed or movable random access memory (RAM), read only memory (ROM), flash memory, hard disk drive (HDD), solid state drive (SSD), other similar devices, or a combination of these devices.

The processor 120 is connected with the storage device 110 and the communication unit 130 and configured to run program codes and essential functions of the file dedup processing system 100. The processor 120 may be a central processing unit (CPU) or any other programmable microprocessor for general or special use, a digital signal processor (DSP), a programmable controller, an application specific integrated circuit (ASIC), other similar devices, or a combination of these devices, but the disclosure is not limited thereto.

The communication unit 130 is, for example, a wireless network card supporting a wireless communication standard, e.g., an institute of electrical and electronics engineers (IEEE) 802.11n/b/g standard, or a network card supporting wired network connection, e.g., Ethernet. The communication unit 130 may conduct network connection with other electronic devices on a network in a wireless or a wired networking manner. In an embodiment, the communication unit 130 may be implemented by a communication chip, where the communication chip may be a device supporting a wireless fidelity (Wi-Fi) system, a global system for mobile communication (GSM), a personal handy-phone system (PHS), a code division multiple access (CDMA) system, a wideband code division multiple access (WCDMA) system, a long term evolution (LTE) system, a worldwide interoperability for microwave access (WiMAX) system or the Bluetooth signal transmission.

In an embodiment of the disclosure, the file dedup processing system 100 is connected with a remote device 10 through the communication unit 130, thereby expanding the storage space that is available for the file dedup processing system 100. The remote device 10 may be a device provided with a storage space and a networking function, for example, a personal computer (PC), a supercomputer, a server, a network attached storage (NAS) and so on. The file dedup processing system 100 may use a chunk store jointly formed by the storage device 110 and the storage apparatus of the remote device 10 for storage.

In addition, the storage device 110 further stores a file dedup subsystem 112 and a file subsystem 114. The file dedup subsystem 112 may execute data deduplication on raw files, so as to generate decuplicated vault files which are stored in the chunk store. Specifically, the file dedup subsystem 112, for example, divides each of the files stored in the storage device 110 into a plurality of chunks and checks whether there are identical data in these chunks. Because duplicate chunks having identical data occupy a great amount of the storage space, the file dedup subsystem 112 deletes the duplicate data chunks corresponding to identical data, and the duplicate chunks are stored in only one copy or copies less than the number of duplication times. The data of the decuplicated chunks may be further compressed to reduce a storage size, encrypted to increase security and added with error-correcting codes for correcting data corruption caused by the storage or transmission process. The plurality of deduplicated chunk data may be stored in one or more vault files and stored in the storage device 110 or in the chunk store of the remote device 10. In an embodiment of the disclosure, a size of each vault file may be 50 megabytes (MB) or 100 MB or less, but the disclosure is not limited thereto.

In addition, for a decuplicated file, the file dedup subsystem 112 generates a descriptor to indicate a storage location of each data chunk of the file in the vault file and a storage location of the vault file in the chunk store. In this way, the file dedup subsystem 112, when being about to read the file, may find the vault file corresponding to the file according to the descriptor and recover the file according to the vault file.

Specifically, the descriptor at least records an identification code of the vault file having the data chunk of the file, an offset and a length of the file in the vault file and an offset and a length of each data chunk in the file. Specifically, an offset represents a start location of a data chunk in the vault file, and the offset plus the length represents an end location of the data chunk in the vault file. In addition, the descriptor also records the offset and the length of each data chunk in the file, wherein the offset of each data chunk represents an offset from the start location of the file to the start location of the data chunk in the file, and the offset plus the length of the data chunk represents an end location of the data chunk in the file. In other words, the file dedup processing system 100, when being about to read an arbitrary file, may find the storage location of the vault file having the data chunk of the requested file in the chunk store according to the offset and the length of the requested file and the descriptor, and find the data chunk according to the offset and the length of each data chunk in the vault file, so as to read data of the file.

Figure 2:
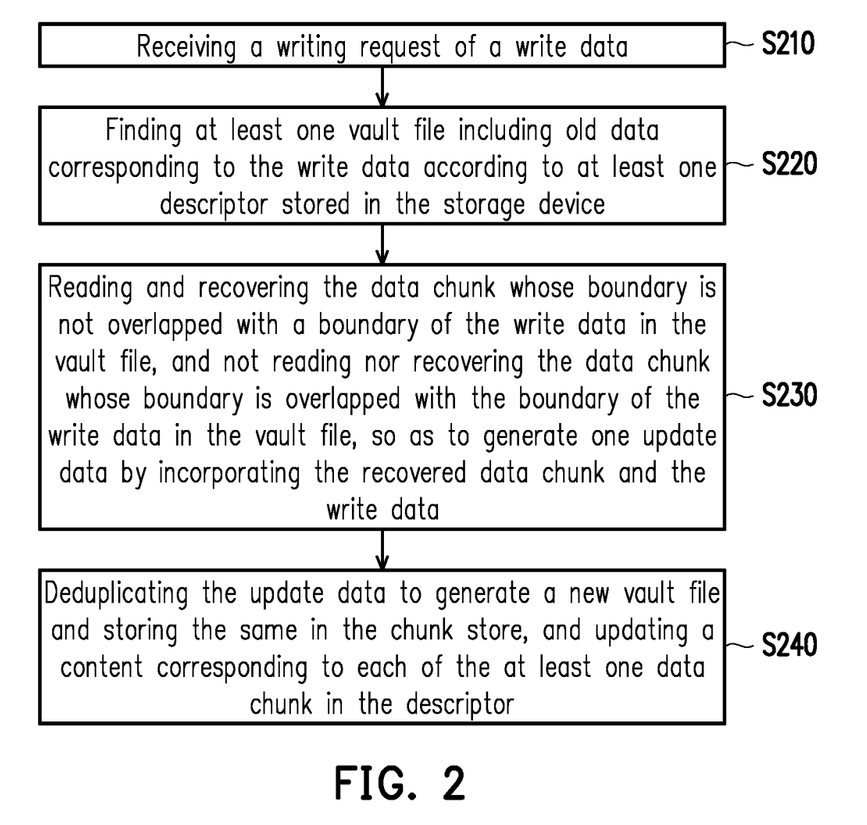
FIG. 2 is a flowchart illustrating a file processing method according to an embodiment of the disclosure.

FIG. 2 is a flowchart illustrating a file processing method according to an embodiment of the disclosure. Referring to both FIG. 1 and FIG. 2, the method of the present embodiment is applicable to the file dedup processing system 100 described above, and detailed steps of the file processing method of the present embodiment will be described with reference to each device and element of the file dedup processing system 100.

First, in step S210, the processor 120 executes the file subsystem 114 to receive a writing request of a write data of a file, and in step S220, finds at least one vault file including old data corresponding to the write data of the file according to at least one corresponding descriptor stored in the storage device 110. The vault file is obtained by, for example, deduplicating at least one raw file and is stored in at least one chunk store in a local end, in a remote end or in both, and the descriptor indicates a storage location of each data chunk of each raw file in the chunk store.

Figure 3:
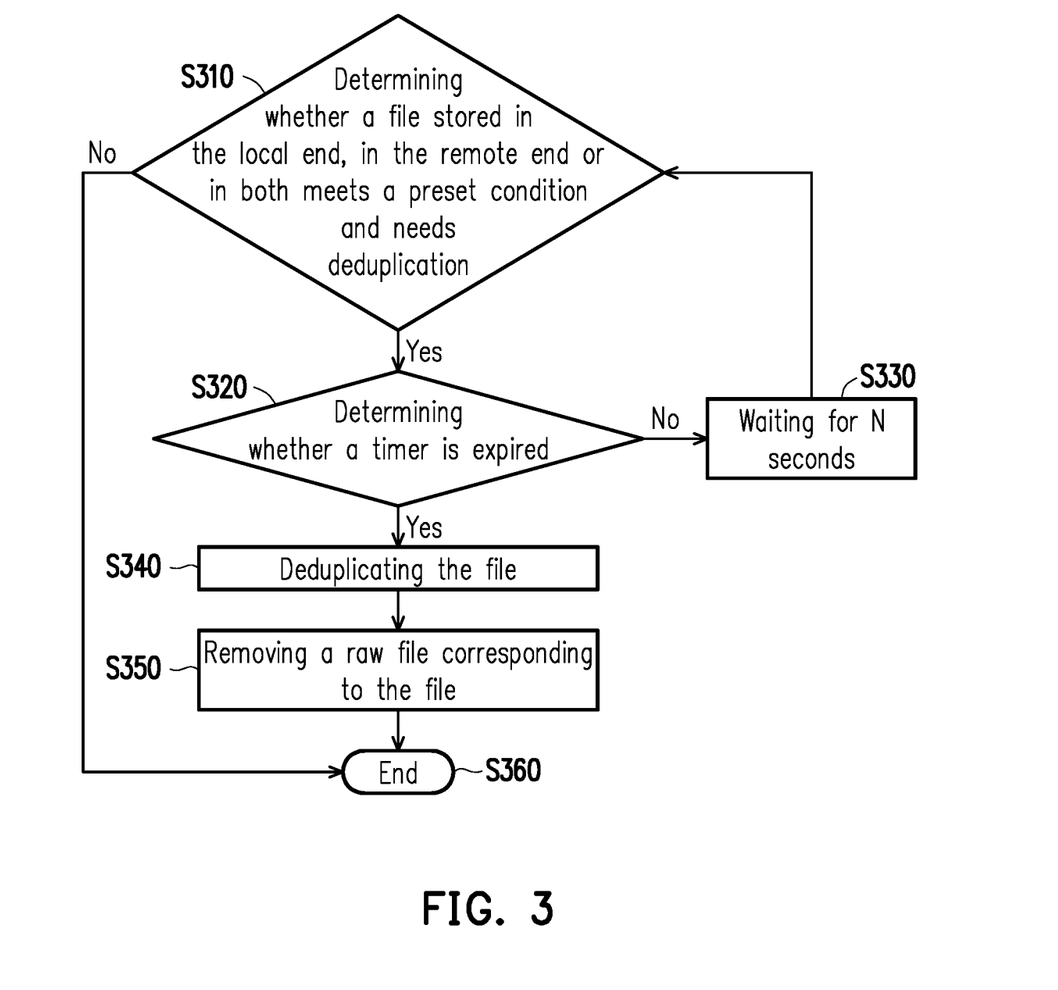
FIG. 3 is a flowchart illustrating a file deduplication method according to an embodiment of the disclosure.

Specifically, FIG. 3 is a flowchart illustrating a file deduplication method according to an embodiment of the disclosure. Referring to both FIG. 1 and FIG. 3, the method of the present embodiment is applicable to be implemented by the aforementioned processor 120 executing the file dedup subsystem 112. In step S310, the file dedup subsystem 112 determines whether a file stored in the local end, in the remote end or in both meets a preset condition and needs deduplication. Therein, the condition for determining whether the file needs deduplication includes, a file size, a filename extension or a filename form.

If the file needs no deduplication, jumping to step S360, the process ends. However, if the file needs the deduplication, in step S320, the file dedup subsystem 112 determines whether a timer is expired. Specifically, in the present embodiment, the file dedup subsystem 112 determines whether to execute the deduplication according to an existence duration of the file. If the timer is not expired, in step S330, the file dedup subsystem 112 continuously wait N seconds (sec), e.g., 3600 sec and again confirms whether the timer is expired.

In step S320, if the timer is expired, the file dedup subsystem 112 performs step S340 to deduplicate the file. And, after the deduplication, in step S350, the file dedup subsystem 112 removes a raw file corresponding to the file to generate or update a descriptor indicating a storage location of a new vault file in the chunk store. Specific methods for writing and deduplicating will be described below.

It should be noted that the vault file stores not only old data corresponding to the write data, but also other data not corresponding to the write data, while the current operation is to write a new data being the write data (to replace the old data corresponding to the write data). Thus, in step S230, the processor 120 executes the file dedup subsystem 112 to read and recover (i.e., de-deduplicate) each data chunk whose boundary of the storage location is not overlapped with a boundary of the old data corresponding to the write data in each vault file (but not read nor recover each data chunk whose boundary is overlapped with the boundary of the old data corresponding to the write data in each vault file) so as to generate update data by incorporating the recovered data chunks with the write data. In particular, for those data chunks included the old data corresponding to the write data, because the current operation is to write the new data being the write data, it is not necessary to recover all the data chunks of the old data corresponding to the write data included in the vault file, but only to recover the specific data chunks corresponding to the write data in the vault file, i.e., the aforementioned data chunks whose boundaries are overlapped with the boundary of the old data corresponding to the write data, and then, fills blank data chunks corresponding to data chunks of the old data with the new data being the write data so as to obtain an update data. This update data is identical to the update data obtained by incorporating the completely recovered data with the write data.

Specifically, because the processor 120, when reading the vault file, reads and recovers data in units of data chunk, some of the data chunks among the multiple data chunks included in the vault file are completely used to store the write data (i.e., the boundary of each data chunk is completely overlapped with the boundary of the write data), and some of the data chunks store not only the write data, but also other data (i.e., the data of each data chunk whose boundary is not overlapped with the boundary of the write data). Because the current operation is to write the new data being the write data, the processor 120 does not have to read each data chunk whose boundary is overlapped with the boundary of the old data corresponding to the write data, but only reads each data chunk whose boundary is not overlapped with the boundary of the old data corresponding to the write data, thereby reducing an amount of the data for the reading and recovering operation.

Lastly, in step S240, the processor 120 deduplicates the update data to generate at least one new vault file and store the same in the chunk store, and updates a content corresponding to each data chunk in the descriptor. By further deduplicating the updated data (data including the write data) and updating the descriptor indicating the storage location thereof, it can be ensured that all the files written by the file dedup processing system 100 are stored in a way that is the most storage space saving (i.e., the file is deduplicated).

Figure 4:
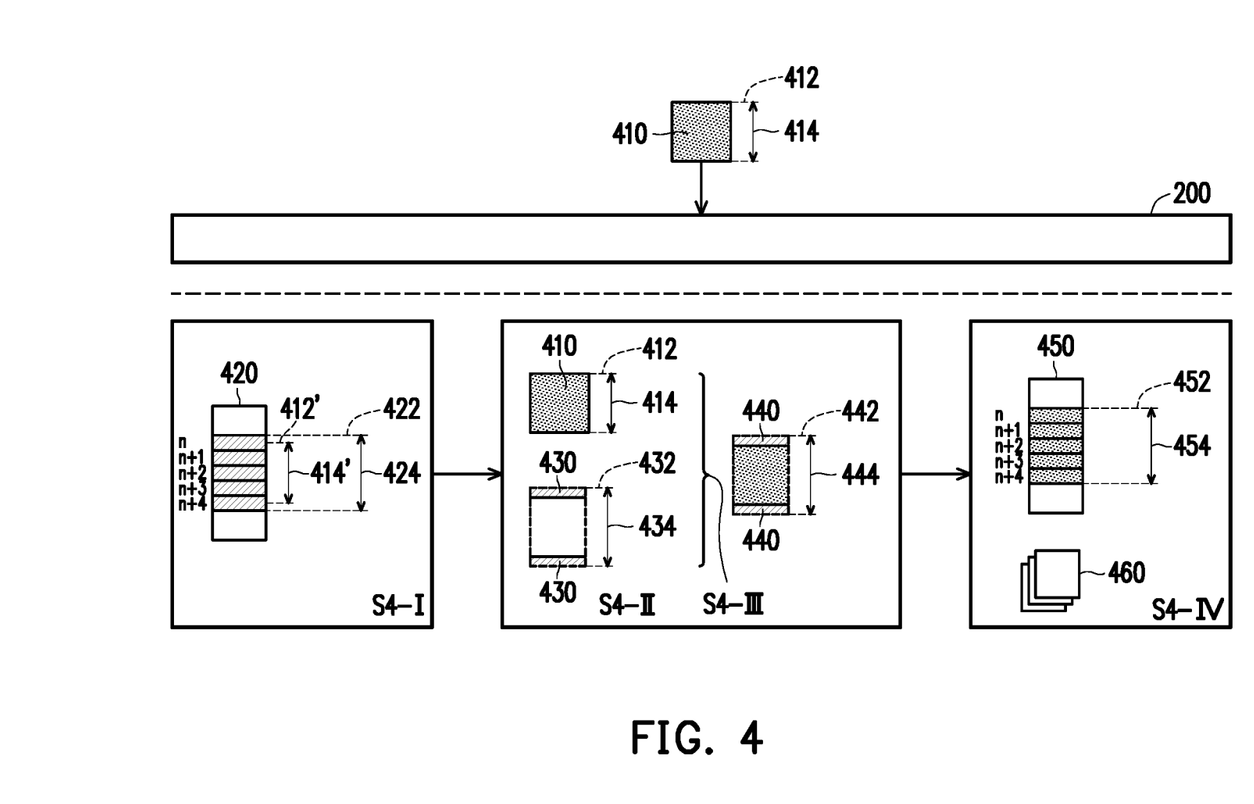
FIG. 4 is a schematic diagram illustrating the file processing method according to an embodiment of the disclosure.

For example, referring to FIG. 4, FIG. 4 is a schematic diagram illustrating the file processing method according to an embodiment of the disclosure. Referring to both FIG. 1 and FIG. 4, in the present embodiment, the file dedup processing system 100 in advance receives and deduplicates a file corresponding to a write data 410 (i.e. the old data corresponding to the write data illustrated in FIG. 3), and generates a descriptor and vault file corresponding thereto. In other words, the chunk store of the file dedup processing system 100 already stores the vault file corresponding to the write data 410. In the present embodiment, the reading and writing operations of all files are in charged by a file system 200 of the file dedup processing system 100. The file system 200 includes, for example, the file dedup subsystem 112 and the file subsystem 114 of the embodiments described above.

When the file system 200 receives a writing request of the write data 410, in step S4-I, the file system 200 searches a descriptor 420 to find an offset 422 and a length 424 of the vault file corresponding to the write data 410 in the chunk store and an offset 412' and a length 414' of the data received in advance and corresponding to write data 410 in the vault file, so as to find a storage location (i.e., chunks n to (n+1) of the vault file corresponding to the write data 410 in the chunk store and a storage location corresponding to the write data 410 in the vault file. The embodiment described above takes one vault file (having the offset 422 and the length 424) as an example for illustration, but the disclosure is not limited thereto. The previous data of the write data 410 may be stored in different storage locations in a plurality of vault files.

In step S4-II, the file system 200, for example, writes the data of the write data 410 into a memory buffer. Then, the file system 200 only reads data 430 (i.e., data of the data chunk 1 and the data chunk (n+4)) in the vault file to the memory buffer according to the offset 422 and the length 424 of each vault file and the offset 412' and the length 414' of the write data in the vault file. The data 430 is partially overlapped with the write data 410 from the chunk store. In step S4-III, the file system 200 incorporates the data 430 and the write data 410 to generate update data 440 (which has an offset 442 and a length 444). As illustrated in the drawing, the partially overlapped data 430 only includes the data of the data chunk n and the data chunk (n+4). Because the data in the vault file corresponding to the write data (i.e., the data of the data chunks (n+1) to (n+3)) will be replaced by the data (new data) of the write data 410, the file system 200 does not read and recover the data in the vault file which is completely overlapped with the write data.

In step S4-IV, the file system 200 deduplicates the update data 440 to generate a new vault file 460 and stores the vault file 460 in the chunk store. In addition, the file system 200 also updates the descriptor, such that an updated descriptor 450 indicates storage locations of the written update data in the chunk store (which includes a location of each corresponding vault file in the chunk store and a location of the write data in each vault file).

Besides the dedup-writing operation of the data, the file system 200 of the present embodiment also supports a dedup-reading operation and typical reading and writing operations. Embodiments thereof are provided below for detailed description.

Figure 5:
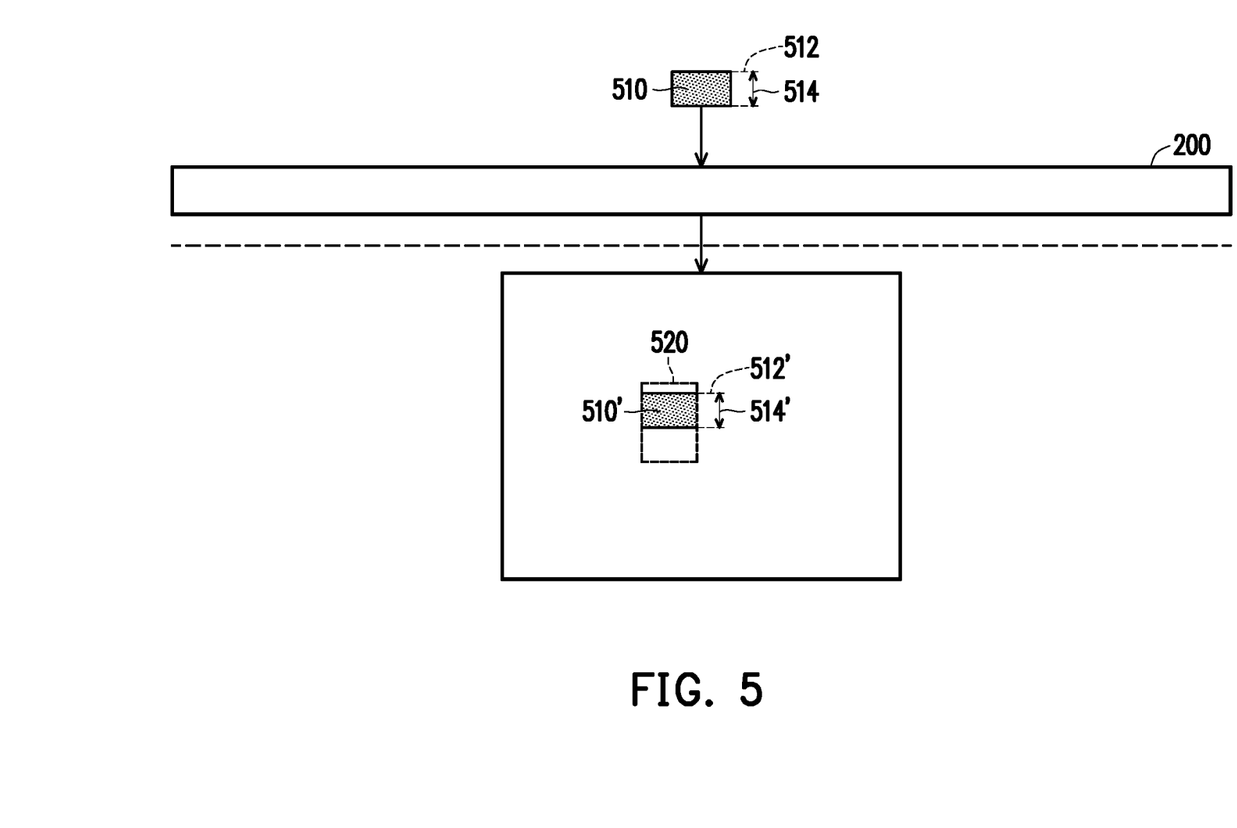
FIG. 5 is a schematic diagram illustrating the file processing method according to an embodiment of the disclosure.

FIG. 5 is a schematic diagram illustrating the file processing method according to an embodiment of the disclosure. Referring to FIG. 5, in the present embodiment, when the file system 200 receives a writing request of one write data 510, the file system 200 determines whether a non-deduplicated raw file 510' corresponding to the write data 510 exists in a storage space 520. If the non-decuplicated raw file 510' exists, the file system 200 writes the write data 510 into a location (with an offset 512' and a length 514') where the non-decuplicated raw file 510' is located according to an offset 512 and a length 514 of the write data 510.

If the file system 200 determines that the non-deduplicated raw file 510' of the write data 510 does not exist in the storage space 520, the file system 200 stores the write data 510 in a new file. The file system 200, for example, may further determine whether to execute deduplication on the stored new file according to the deduplication condition mentioned above.

Figure 6:
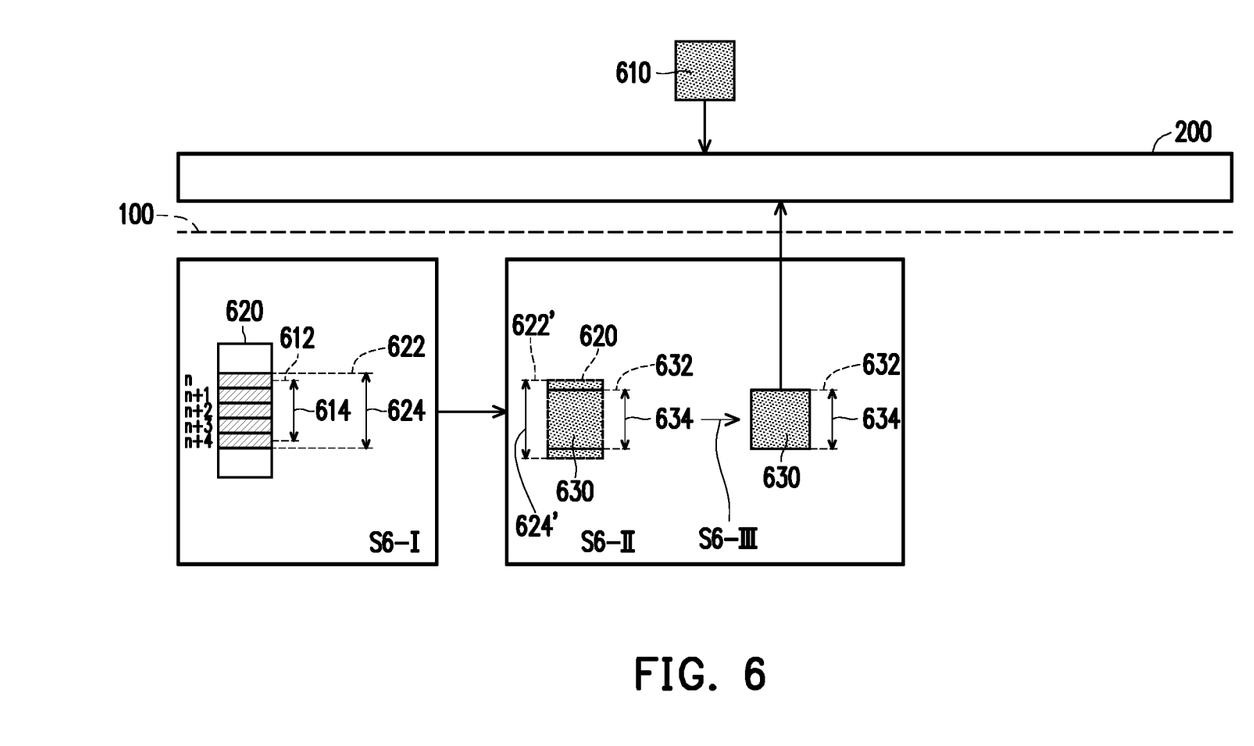
FIG. 6 is a schematic diagram illustrating the file processing method according to an embodiment of the disclosure.

FIG. 6 is a schematic diagram illustrating the file processing method according to an embodiment of the disclosure. Referring to FIG. 6, in the present embodiment, when the file system 200 receives a reading request of a previous file 610, the file system 200 may first reserve a storage space in the memory buffer for reading the previous file 610 and in step S6-I, search a descriptor 620 to find an offset 622 and a length 624 of a vault file corresponding to the previous file 610 in the chunk store and an offset 612' and a length 614' of the previous file 610 in the vault file, so as to find storage locations (i.e., chunks n to (n+1)) of the vault file corresponding to the previous file 610 in the chunk store and a storage location of the previous file 610 in the vault file. In the above embodiment, it also takes one vault file (having the offset 622 and the length 624) as an example for illustration, but the disclosure is not limited thereto, and the data of the previous file 610 may be stored in different storage locations in a plurality of vault files.

In step S6-II, the file system 200 reads the vault file according to the offset 622 and the length 624 of the vault file and recovers it to generate a raw file 620' (which has an offset 622' and a length 624').

Then, in step S6-III, the file system 200 reads data 630 of the previous file 610 and copies the data 630 to the previously reserved storage space according to the storage location (with an offset 632 and a length 634) of the previous file 610 in the vault file, so as to complete the data reading operation of the previous file 610.

Figure 7:
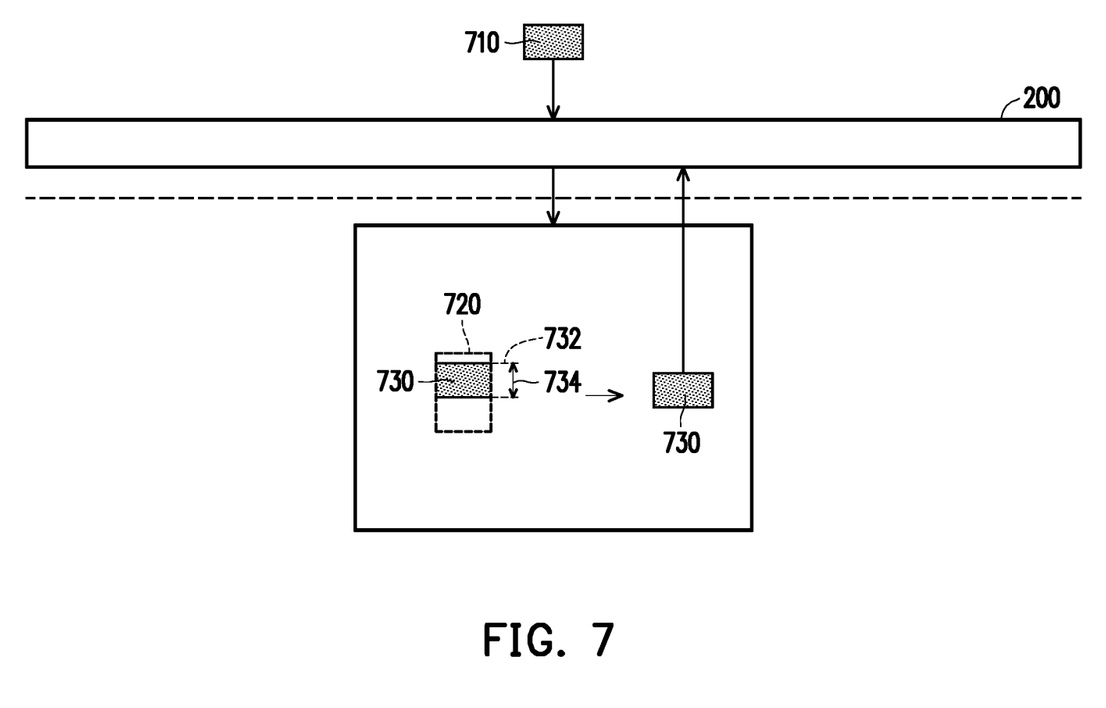
FIG. 7 is a schematic diagram illustrating the file processing method according to an embodiment of the disclosure.

FIG. 7 is a schematic diagram illustrating the file processing method according to an embodiment of the disclosure. Referring to FIG. 7, in the present embodiment, when the file system 200 receives a reading request of a previous file 710, the file system 200 may first reserve a storage space in the memory buffer for reading the previous file 710 and determines whether a non-deduplicated raw file of the previous file 710 exists in a storage space 720. If the non-decuplicated raw file exists, the file system 200 directly reads data 730 of the previous file 710 and copies the data 730 to the previously reserved storage space according to an offset 732 and a length 734 of the previous file 710 in the storage space 720, so as to complete the data reading operation of the previous file 710.

It should be noted that in an embodiment of the disclosure, the file dedup processing system further includes a file moving subsystem (which is not shown), which is capable of moving or backuping the vault file and the corresponding descriptor to the remote device according to a use record or a backup requirement of the vault file. Particularly, the file moving subsystem, for example, moves the vault file according to a frequency of data access. For example, when a frequency of accessing the vault file is high, the file moving subsystem stores the vault file in the local end, and when the frequency of accessing the vault file is low, the file moving subsystem, for example, moves the vault file to the remote device, thereby reserving more storage space in the local end for system operation while saving the data storage space by the deduplication operation.

Based on the above, in the file dedup processing system and the file processing method thereof provided by the disclosure, files are periodically deduplicated as the vault files, and the vault files recording the write data in the chunk store are found according to the descriptors obtained by the previously executed deduplication when the request for writing or reading the files is received, so as to execute the reading, writing and deduplication operations on the files. In this way, optimization of the file processing can be achieved while the data reduction is executed.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. A file deduplication (dedup) processing system, comprising:
   a storage device, storing a plurality of subsystems; and
   a processor, coupled to the storage device, loading and executing the subsystems in the storage device,
   wherein the subsystems comprise:
      a file dedup subsystem, deduplicating at least one raw file so as to generate at least one deduplicated vault file and at least one descriptor, wherein the vault file comprises at least one data chunk and is stored in at least one chunk store, the descriptor is configured to indicate a storage location of each of the at least one data chunk in the vault file corresponding to the raw file and a storage location of the vault file in the chunk store; and
      a file subsystem, writing and reading files, wherein
         the file subsystem finds the vault file comprising old data corresponding to a write data according to the descriptor when receiving a writing request of the write data, and
         the file dedup subsystem reads and recovers the data chunk whose boundary is not overlapped with a boundary of the write data in the vault file comprising the old data corresponding to the write data and does not read nor recover the data chunk whose boundary is overlapped with the boundary of the write data so as to generate an update data by incorporating the recovered data chunk and the write data, deduplicates the update data to generate a new vault file and stores the same in the chunk store, and updates a content corresponding to each of the at least one data chunk in the descriptor.

2. The file dedup processing system according to claim 1, wherein the file subsystem further finds data in the old data corresponding to the write data which is not comprised in the vault file according to the descriptor, and the file dedup subsystem deduplicates the write data to generate the new vault file and stores the same in the chunk store, and updates the descriptor.

3. The file dedup processing system according to claim 1, wherein the file dedup subsystem determines whether to deduplicate the at least one raw file according to a file attribute of each of the at least one raw file, wherein the file attribute comprises a file size, an existence duration, a filename extension, a filename form or a file property.

4. The file dedup processing system according to claim 1, wherein the file subsystem determines whether a non-deduplicated raw file of the write data exists when receiving the writing request of the write data, and the file subsystem directly writes the write data into the non-deduplicated raw file when storing the non-decuplicated raw file.

5. The file dedup processing system according to claim 4, wherein the file dedup subsystem deduplicates the write data to generate a new vault file so as to store the new vault file in the chunk store and generate a new descriptor indicating a storage location of the write data in the chunk store when the file subsystem determines that the non-decuplicated raw file of the write data does not exist and that the deduplicated vault file does not exist.

6. The file dedup processing system according to claim 1, wherein the file subsystem finds the vault file comprising at least one data chunk of a previous file according to the descriptor when receiving a reading request of the previous file, and the file dedup subsystem reads and recovers the at least one data chunk belonging to the previous file in the vault file.

7. The file dedup processing system according to claim 1, wherein the file subsystem determines whether a non-deduplicated raw file of a previous file exists when receiving a reading request of the previous file, and reads the non-decuplicated raw file when the non-decuplicated raw file exists.

8. The file dedup processing system according to claim 1, wherein a size of each of the at least one vault file is 100 megabytes (MB) or less.

9. The file dedup processing system according to claim 1, wherein the chunk store is located in the storage device, in at least one remote device connected with the file dedup processing system or in both.

10. The file dedup processing system according to claim 1, wherein the subsystems further comprise:
a file moving subsystem, moving or backuping the vault file and the corresponding descriptor to at least one remote device according to a use record or a backup requirement of the vault file.

11. A file processing method, applicable for a file dedup processing system comprising a storage device and a processor, the method comprising:
receiving, by the processor, a writing request of a write data;
finding, by the processor, at least one vault file comprising old data corresponding to the write data according to at least one descriptor stored in the storage device, wherein the vault file is obtained by deduplicating at least one raw file and is stored in at least one chunk store, and the descriptor indicates a storage location of each of at least one data chunk in the vault file corresponding to the raw file and a storage location of the vault file in the chunk store;
reading and recovering, by the processor, the data chunk whose boundary is not overlapped with a boundary of the write data in the vault file and not reading nor recovering the data chunk whose boundary is overlapped with the boundary of the write data in the vault file, so as to generate an update data by incorporating the recovered data chunk and the write data; and
deduplicating, by the processor, the update data to generate a new vault file and storing the same in the chunk store, and updating a content corresponding to each of the at least one data chunk in the descriptor.

12. The file processing method according to claim 11, comprising:
determining, by the processor, whether to deduplicate the raw file according to a file attribute of each of the at least one raw file, wherein the file attribute comprises a file size, an existence duration, a filename extension, a filename form or a file property.

13. The file processing method according to claim 11, comprising:
determining, by the processor, whether a non-deduplicated raw file of the write data exists when receiving the writing request of the write data and directly writing the write data into the non-deduplicated raw file when the non-decuplicated raw file exists.

14. The file processing method according to claim 11, comprising:
deduplicating, by the processor, the write data to generate a new vault file so as to store the new vault file in the chunk store and generate a new descriptor indicating a storage location of the write data in the chunk store when determining that the non-decuplicated raw file of the write data does not exist and that the deduplicated vault file does not exist.

15. The file processing method according to claim 11, comprising:
finding, by the processor, the vault file comprising at least one data chunk of the previous file according to the descriptor and by the file dedup subsystem, reading and recovering the data blocks belonging to the previous file in the vault file when receiving a reading request of a previous file.

16. The file processing method according to claim 11, comprising:
determining, by the processor, whether a non-deduplicated raw file of the previous file exists when receiving a reading request of a previous file and reading the non-deduplicated raw file when the non-decuplicated raw file exists.

17. The file processing method according to claim 11, further comprising:
dividing, by the processor, the at least one raw file into a plurality of chunks, deleting a part of duplicate chunks having identical data among the chunks and reserving one or more of the duplicate chunks to generate the vault file, wherein the number of the reserved one or more duplicate chunks is less than a number of duplication times.

18. The file processing method according to claim 17, further comprising:
performing, by the processor, at least one of compression, encryption and addition of an error correction code on the reserved one or more duplicate chunks.

19. The file processing method according to claim 11, further comprising:

moving or backuping, by the processor, the vault file and the corresponding descriptor to at least one remote device according to a use record or a backup requirement of the vault file.

20. The file processing method according to claim 11, further comprising:

determining, by the processor, to store the vault file in the storage device or move the vault file to at least one remote device according to characteristics of the storage device and the vault file.

* * * * *